United States Patent [19]

Giflo et al.

[11] Patent Number: 4,906,435
[45] Date of Patent: Mar. 6, 1990

[54] ACTIVATOR MIXTURE FOR INCREASING THE STRENGTH OF IRON ALLOYS

[76] Inventors: Henrik Giflo, Űjítók utca 5, 3532 Miskolc; Henrik Giflo, Ifjûság ût 4, 3529 Miskolc, both of Hungary

[21] Appl. No.: 272,982
[22] PCT Filed: Dec. 23, 1986
[86] PCT No.: PCT/HU86/00072
 § 371 Date: Aug. 30, 1988
 § 102(e) Date: Aug. 30, 1988
[87] PCT Pub. No.: WO88/04697
 PCT Pub. Date: Jun. 30, 1988

[30] Foreign Application Priority Data

Nov. 19, 1984 [HU] Hungary .............................. 4288/84

[51] Int. Cl.$^4$ ................................................ C21C 7/00
[52] U.S. Cl. .......................................... 420/129; 75/58
[58] Field of Search .................................. 420/129, 58

[56] References Cited

U.S. PATENT DOCUMENTS 3,020,153  2/1962  Linz ...................... 420/129
3,767,380  10/1973  Csepanyi ............... 420/129

Primary Examiner—Peter D. Rosenberg
Attorney, Agent, or Firm—Handal & Morofsky

[57] ABSTRACT

An activator mixture for improving utilizable strength steels which consists essentially Ca and/or Na 16 to 30%; Si 13 to 30%; V and/or Mo 2 to 28%, Nb and/or Ta 2 to 14%, Al and/or Ba 1 to 15%; B and/or Be 0,1 to 3.0%, Cl to 5%; Fe 5 to 20% and N 1 to 10%.

5 Claims, No Drawings

ACTIVATOR MIXTURE FOR INCREASING THE STRENGTH OF IRON ALLOYS

The invention relates to an activator mixture, consisting of a pluraty of components which improves metallurgic quality of alloy systems on iron basis and increases considerably the strength thereof, when used in course of steel production or welding as a pulverized inset of filler wires.

Increased requirements to be met by steels, as basic materials, in compliance with functional up-to-dateness and points of view of general energy and material savings, are directed to increased value in use and not to quantity. This increase in value of use has been directed to the increase of the complexicity.

Accordingly, value of use of steels has been determined mostly—in dependence of final destination—by the metallurgic quality, stress-tolerance of permanent deformation, embrittlement, stress limit of fatigue, weldability and resistance to wear.

Out of the characteristics forming the value of use of steels one of the most important features is the stress without permanent deformation.

The value of the highest stress to be used without deformation represents a characteristic feature of steels, which determines the the loadability and weight of the structures or structural elements made thereof in the majority of cases but influences them fundamentally in all cases.

Another important feature forming value of use of steels is the plasticity.

In general with steels increase in strength is accompanied by a decreased plasticity. Development of presently used steels is determined by the up-to-dateness of processing technology in compliance with development of the general technical level. Nevertheless, increased utilization of strength range of pure iron has not been properly emphasized in industrial alloy systems in order to increase loadability and reduce weight.

Presently used steels—with the exception of some functional parameters required by special technologies—do not serve for meeting the endeavours of application technics directed to modernization, material and energy savings.

Quick reduction of general energy and material reserves and thus ever increasing costs require necessarily that for producing or using any article of use or means a minimum of material, steel and energy should be applied.

Different methods are known for improving a single property of a steel by alloying or by heat treatment, in accordance with the intended final use.

With industrially produced steels, as a result of lattice faults, dislocations resulting from the different form, size and orientation of the single crystals, permanent deformation is induced by a stress, which is 1000- times lower, than theoretical lattice force.

In this way, every hindrance which hinders motion of dislocations in steel, increases strength of the steels. Such are e.g. elements located in the lattice dissolved by substitution or interstition, dislocations, grain limits, twin crystals, alien phases, generations, all being independent strengthening mechanisms in itselves. Practice confirmed the fact, is so far as presently used methods for increasing steel strength - as they activate but one or two strengthening mechanisms and mainly thermically—can plasticity characteristics and with a restricted result in respect of strength increasing.

The object of the present invention is to provide an activator mixture a metallurgical way for strengthening steels in, under the additive effect of which strength of steels can be increased by keeping simultaneously plasticity on the proper level and impovement of metallurgic quality can be simultaneously achieved, thus utilizuing theoretical lattice force for loadability, in systems of industrial application.

According to the invention the composition of the mixture used in a quantity oif 5 to 17 kg/t in course of steel production or as a pulverized inset of filler wires is as follows

| | |
|---|---|
| Ca and/or Na | 16 to 30% |
| Si | 13 to 30% |
| V and/or Mo | 2 to 28% |
| Nb and/or Ta | 2 to 25% |
| Zr and/or Ce | 2 to 15% |
| Ti | 2 to 14% |
| Al and/or Ba | 1 to 15% |
| B and/or Be | 0,3 to 3,0% |
| C | 1 to 5% |
| Fe | 5 to 20% and |
| N | 1 to 10%. |

Proportion and quantity of alloying components in accordance with the invention, as well as method of alloyage ensure optimal physico-chemical and metalphysical conditions in course of steel production or welding conditions, when using a filler wire with pulverized inset, which—when becoming predominant in industrial alloy systems on iron basis—improve metallurgical quality and simultaneously considerably increase strength but also keep plasticity properties on the proper level, at the same time increasing ratio of theoretical lattice force to be utilized for load bearing.

In course of steel production the mixture is alloyed with a maximum grain size of 8 mm, well mixed, packed in an easily treatable size into the ladle while discharging, utilizing the agitating effect of the liquid steel beam or by means of the method—widely used in practice—in course of which—after having finished discharge—the mixture is blown into the liquid steel. When producing filler wire with pulverized inset, the activator is charged in the prescribed fraction and well mixed.

Properties of the single alloying components and properly chosen proportion thereof in the alloy systems result in local physicochemical, nuclear and kynetic conditions in course of alloyage, strengthening, heating and hot formation, as well as re-crystallization, which considerably increase the quantity of the elements which can be utilized for increasing the strength and relevant efficiency.

Out of the components used in an expedient proportion some form complex compounds in the steel with a melting point, which are producing partly crystal nuclei of active size already in the melt thus increasing crystalliazation ability, simultaneously shortening time of solidification, partly on their effect primary grain size and possibility of enrichment are reduced, advantageous conditions of re-crystallization are considerably improved.

Thereafter, the alloy proportion in accordance with the invention establish conditions in course of solidification and re-crystallization, which are considerably increasing dissolving activity of the single elements built-in by interstition and thus soluble quantity thereof, and so number of the pre-stressed lattices and extend of their stressed state. Pre-stressing of the lattices by interstition increases intensely number of produced dislocations, which are partly promoting, partly determining the formation of the segregations for hindering their displacement.

Out of the components of the mixture some are forming complex metallic segregations of high shear-strength, which are partly increasing, partly stabilizing the internal stress of the lattice of the basic material, when built-in into the lattice faults. In such a manner lattice faults produced metallurgically of increased number promote formation of metallic segregations determining their place and density of arrangement, thus considerably increasing efficiency of anchoring function of segregations, in the motion of dislocation beginning under the influence of loading.

Some of the components of the mixture, when deposited in the lattice faults on the grain boundaries, decrease diffusion velocity of the metal atoms in their environment thus delaying the process of non-coherent segregations in this place. In such a manner enrichment of undesired segregations along the grain boundaries are hindered, their inhomogeneity in the alloying elements will be prevented. In such a manner strength of homogeneous grain boundaries will be considerably increased, premature cracking occuring as a result of loading can be delayed, stretching and contraction up to creeping-break increases, ductility of the alloy system, cold and hot malleability and ductibility, fatigue limit and strength to be utilized for loadability increase.

Some of the components of the mixture produce inclusions of low specific weight, which are easily up into the slag, thus considerably reducing harmful inclusion content of steel. In addition, complex spherical inclusions are also formed, which are partly remaining in the steel and keep their original shape even in course of plastic deformation, partly they bind sulfur atoms on their surface, forming a sulfid coating, thus considerably reducing possibility of ironic sulfid formation; in this way more advantageous plasticity and anisotropic properties can be assured for the steel.

Accordingly, the mixture according to the invention guarantees automatically improved metallurgical quality of given steels, complete function of strengthening mechanisms without thermic influences and predominance thereof in an optimal proportion in compliance with the basic material, additive superposition of their combination, simultaneously increasing utilizable strenght of steels.

The effect of the mixture according to the invention will be illustrated by means of the following examples. Table 1 contains the chemical composition of charges A-1, A-2 and A-2 treated with activator, and the basis charges B-1, B-2 and B-3 in weight-%.

TABLE 1

|     | $A_1$ | $B_1$ | $A_2$ | $B_2$ | $A_3$ | $B_3$ |
|-----|-------|-------|-------|-------|-------|-------|
| C   | 0,15  | 0,14  | 0,23  | 0,27  | 0,07  | 0,07  |
| Mn  | 1,54  | 1,65  | 1,88  | 1,77  | 0,60  | 0,68  |
| Si  | 0,52  | 0,42  | 0,72  | 0,45  | 0,47  | 0,64  |
| P   | 0,013 | 0,021 | 0,009 | 0,019 | 0,009 | 0,008 |
| S   | 0,006 | 0,013 | 0,009 | 0,021 | 0,018 | 0,021 |
| Cr  | 0,32  | 0,27  | 0,50  | 0,23  | 11,32 | 11,43 |
| Ni  | 0,10  | 0,07  | 0,21  | 0,07  | 0,08  | 0,07  |
| Cu  | 0,09  | 0,23  | 0,12  | 0,21  | 0,13  | 0,07  |
| Mo  | 0,10  | 0,08  | 0,16  | 0,06  | 0,07  | 0,02  |
| Nb  | 0,09  | 0,04  | 0,11  | —     | 0,043 | —     |
| V   | 0,14  | 0,16  | 0,10  | —     | 0,02  | 0,04  |
| Zr  | 0,01  | —     | 0,02  | —     | 0,03  | —     |

TABLE 1-continued

|     | $A_1$  | $B_1$ | $A_2$  | $B_2$ | $A_3$   | $B_3$ |
|-----|--------|-------|--------|-------|---------|-------|
| Ti  | 0,02   | 0,03  | 0,02   | 0,01  | 0,03    | 0,64  |
| Al  | 0,04   | 0,12  | 0,062  | 0,072 | 0,032   | 0,053 |
| N   | 0,026  | 0,007 | 0,010  | 0,009 | 0,029   | 0,007 |
| B   | 0,0024 | 13    | 0,0017 | —     | 0,0020  | —     |
| Ce  | 0,030  | —     | 0,024  | —     | 0,012   | —     |
| Ca  | 0,0012 | —     | 0,0006 | —     | 0,00009 | —     |

Charges were prepared on a steel-manufacturing equipment UHP+AOD with a volume of 50 tons; the composition and amount of the activator mixture having been used for steel production is given in Table 2.

TABLE 2

|      | $A_1$ | $A_2$ | $A_3$ |
|------|-------|-------|-------|
| Ca   | 21,14 | 12,96 | 19,29 |
| Na   | —     | —     | —     |
| Si   | 20,50 | 17,34 | 27,57 |
| V    | 10,69 | 7,51  | 1,67  |
| Mo   | 7,63  | 12,01 | 5,86  |
| Nb   | 6,87  | 8,26  | 3,60  |
| Ta   | —     | —     | —     |
| Zr   | 3,05  | 4,50  | 7,53  |
| Ce   | 2,29  | 1,80  | 1,00  |
| Ti   | 3,05  | 3,00  | 5,02  |
| Al   | 6,11  | 7,51  | 5,86  |
| Ba   | —     | —     | —     |
| C    | 1,29  | 0,75  | 1,67  |
| Fe   | 17,1  | 15,41 | 10,94 |
| N    | 3,94  | 1,88  | 5,02  |
| B    | 0,18  | 0,13  | 0,17  |
| Be   | —     | —     | —     |
| kg/t | 13,10 | 13,32 | 11,95 |

After production sheets in a thickness of 12.5 mm were formed in course of traditional hot metalworking.

Mechanical properties of the sheets in a hot rolled state and tempered at three different temperatures are contained in Table 3, wherein these are compared with similar states of the basic charge. Taking the basic charge as 100 %, %-ual ratio of the charges produced with an activator are also summarized.

TABLE 3

|     | $R_m$ N/mm$^2$ | % | $R_p^{0.2}$ N/mm$^2$ | % | $R_p^{0.002}$ Nmm$^2$ | $\Delta$ % | $A_5$ % |
|-----|------|-----|------|-----|------|-----|------|
| hot rolled | | | | | | | |
| A-1 | 841  | 147 | 720  | 149 | 600  | 259 | 20,7 |
| B-1 | 572  | 100 | 483  | 100 | 231  | 100 | 21,0 |
| A-2 | 1443 | 173 | 1130 | 151 | 994  | 258 | 15,9 |
| B-2 | 832  | 100 | 750  | 100 | 384  | 100 | 14,6 |
| A-3 | 1362 | 250 | 988  | 244 | 810  | 346 | 18,0 |
| B-3 | 545  | 100 | 405  | 100 | 234  | 100 | 16,0 |
| annealed $^x$ and air cooled | | | | | | | |
| A-1 | 854  | 158 | 749  | 184 | 758  | 303 | 20,1 |
| B-1 | 540  | 100 | 407  | 100 | 250  | 100 | 21,3 |
| A-2 | 1175 | 142 | 1113 | 149 | 1084 | 302 | 17,1 |
| B-2 | 872  | 100 | 747  | 100 | 359  | 100 | 15,0 |
| A-3 | 1338 | 257 | 1131 | 290 | 1038 | 447 | 20,6 |
| B-3 | 520  | 100 | 390  | 100 | 232  | 100 | 20,0 |

$R_m$ = tensile stress
$R_p^{0.2}$ = Yield point belonging to an elongation of 0,2%
$R_p^{0.2}$ = elastic limit
$A_5$ = alongation of a length (1) wherein 1 = 5 $\cdot$ diameter of the specimen
$\Delta$ % = difference with respect to the base value
$^x$ = $A_1$ and $B_1$ at 400° C. for 90 min
$A_2$ and $B_2$ at 500° C. for 90 min
$A_3$ and $B_3$ at 600° C. for 90 min It should be noted that the activator mixture according to the invention may be applied for welding as well.

The activator mixture can be in the form of a powder filled band electrode in this case.

We claim:

1. An activator mixture for improving utilizable strength in steels, comprising: Ca, 0 to 30 per cent; Na, 0 to 30 percent; Si, 13 to 30 per cent; V, 0 to 28 per cent; Mo, 0 to 28 per cent; Nb, 0 to 25 per cent; Ta 0 to 25 per cent; Zr, 0 to 15 per cent; Ce, O to 15 per cent; Ti, 2 to 14 per cent; Al, 0 to 15 per cent; Ba, 0 to 15 per cent; B, 0 to 3.0 per cent; Be, 0 to 3.0 per cent; C, 1 to 5 per cent; Fe, 5 to 20 per cent; and N, 1 to 10 per cent, wherein Ca and Na together total 16 to 30 per cent, V and Mo together total 2 to 28 per cent, Nb and Ta together total 2 to 25 per cent, Zr and Ce together total 2 to 15 per cent, Al and Ba together total 1 to 15 per cent, and B and Be together total 0.1 to 3.0 per cent.

2. A process for applying the activator mixture as claimed in claim 1, wherein said mixture is used in the final phase of steel production by introducing said mixture into molten steel before cooling, in a quantity of 5 to 17 kilograms per ton of steel.

3. An activator mixture as claimed in claim 1, wherein said mixture has a maximum grain size of 8 millimeters.

4. A process as claimed in claim 2, wherein said mixture is introduced to molten steel in a ladle and mixing is facilitated by discharging said molten steel from said ladle.

5. A process as claimed in claim 2, wherein said mixture is introduced to molten steel by blowing.

* * * * *